US010255381B2

(12) United States Patent
Walle et al.

(10) Patent No.: US 10,255,381 B2
(45) Date of Patent: Apr. 9, 2019

(54) 3D MODELED OBJECT DEFINED BY A GRID OF CONTROL POINTS

(71) Applicant: DASSAULT SYSTEMES, Velizy Villacoublay (FR)

(72) Inventors: Marie-Helene Walle, Eguilles (FR); Nicolas Montana, Venelles (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 453 days.

(21) Appl. No.: 14/975,169

(22) Filed: Dec. 18, 2015

(65) Prior Publication Data

US 2016/0179987 A1 Jun. 23, 2016

(30) Foreign Application Priority Data

Dec. 23, 2014 (EP) .................................. 14307166

(51) Int. Cl.
*G06F 17/50* (2006.01)
*G06F 17/10* (2006.01)
(Continued)

(52) U.S. Cl.
CPC .............. *G06F 17/50* (2013.01); *G06F 17/10* (2013.01); *G06T 17/30* (2013.01); *G06T 19/20* (2013.01)

(58) Field of Classification Search
CPC .. G06F 17/50; G06T 19/20; G06T 2219/2021
See application file for complete search history.

(56) References Cited

U.S. PATENT DOCUMENTS 4,797,842 A 1/1989 Nackman et al.
6,037,949 A 3/2000 Derose et al.
(Continued)

FOREIGN PATENT DOCUMENTS

EP 1 750 229 A2 2/2007
EP 1 881 457 A1 1/2008
(Continued)

OTHER PUBLICATIONS

Ma, "The Direct Manipulation of Pasted Surfaces" (2000), Technical Report CS-2000-15, pp. 1-73 [retrieved from https://cs.uwaterloo.ca/research/tr/2000/15/CS-2000-15.pdf].*
Bartels et al., "A Technique for the Direct Manipulation of Spline Curves" (1989), Graphics Interface, pp. 33-39 [retrieved from https://pdfs.semanticscholar.org/dc40/ad3318ba73031093c35845388edce08a0982.pdf].*
(Continued)

*Primary Examiner* — Brian W Wathen
(74) *Attorney, Agent, or Firm* — Oblon, McClelland, Maier & Neustadt, L.L.P.

(57) ABSTRACT

It is provided a computer-implemented method for designing a 3D modeled object, comprising providing, to a computer system, a NURBS surface that represents the 3D modeled object and that is defined by a grid of control points; determining (S20), by the computer system, a grid of surface points that belong to the NURBS surface, the grid of surface points corresponding to the grid of control points according to a predetermined invertible function; displaying, by the computer system, the NURBS surface and, on the NURBS surface, the grid of surface points; selecting, by graphical user-interaction, a subset of the surface points; modifying, by graphical user-interaction, position of the selected subset of surface points, and accordingly, updating real-time, by the computer system, the surface, the update being performed according to the predetermined invertible function.

Such a method improves the design of a 3D modeled object.

13 Claims, 8 Drawing Sheets

(51) Int. Cl.
  *G06T 15/00* (2011.01)
  *G06T 17/30* (2006.01)
  *G06T 19/20* (2011.01)

(56) References Cited

U.S. PATENT DOCUMENTS

| | | | |
|---|---|---|---|
| 6,256,038 | B1 | 7/2001 | Krishnamurthy |
| 6,271,856 | B1 | 8/2001 | Krishnamurthy |
| 6,389,154 | B1 | 5/2002 | Stam |
| 6,553,337 | B1 | 4/2003 | Lounsbery |
| 6,587,105 | B1 | 7/2003 | Stam |
| 6,603,473 | B1 | 8/2003 | Litke et al. |
| 6,636,853 | B1 | 10/2003 | Stephens, Jr. |
| 6,639,592 | B1 | 10/2003 | Dayanand et al. |
| 6,738,062 | B1 | 5/2004 | Moreton |
| 6,760,022 | B1 | 7/2004 | Anderson |
| 6,806,874 | B2 | 10/2004 | Biermann |
| 6,920,419 | B2 | 7/2005 | Kitamura et al. |
| 6,950,099 | B2 | 9/2005 | Stollnitz et al. |
| 7,023,435 | B1 | 4/2006 | Litke et al. |
| 7,170,516 | B2 | 1/2007 | Stollnitz et al. |
| 7,200,532 | B1 | 4/2007 | Cheng |
| 7,251,777 | B1 | 7/2007 | Valtchev et al. |
| 7,369,972 | B2 | 5/2008 | Boier-Martin et al. |
| 7,400,323 | B2 | 7/2008 | Nigro |
| 7,417,635 | B2 | 8/2008 | Rockwood et al. |
| 7,423,641 | B2 | 9/2008 | Borac |
| 7,595,799 | B2 | 9/2009 | Nigro |
| 7,636,091 | B2 | 12/2009 | Rockwood et al. |
| 7,893,937 | B2 | 2/2011 | Rosel et al. |
| 7,952,575 | B2 | 5/2011 | Rosel |
| 8,269,770 | B1 | 9/2012 | Carr et al. |
| 8,471,852 | B1 | 6/2013 | Bunnell |
| 2002/0152222 | A1 | 10/2002 | Holbrook |
| 2003/0020710 | A1 | 1/2003 | Biermann et al. |
| 2003/0218609 | A1 | 11/2003 | Maillot et al. |
| 2004/0085311 | A1 | 5/2004 | Lee et al. |
| 2004/0189633 | A1 | 9/2004 | Sederberg |
| 2006/0017723 | A1 | 1/2006 | Baran et al. |
| 2007/0030267 | A1 | 2/2007 | Nigro |
| 2007/0030268 | A1 | 2/2007 | Nigro |
| 2007/0176923 | A1 | 8/2007 | Lee et al. |
| 2008/0024499 | A1 | 1/2008 | Bateman |
| 2008/0036755 | A1 | 2/2008 | Bae et al. |
| 2008/0225043 | A1 | 9/2008 | Rosel |
| 2008/0246767 | A1 | 10/2008 | Shen et al. |
| 2009/0027396 | A1 | 1/2009 | Frisken |
| 2009/0102833 | A1 | 4/2009 | Boier-Martin et al. |
| 2009/0128556 | A1 | 5/2009 | Fischer et al. |
| 2009/0201295 | A1 | 8/2009 | Kripac et al. |
| 2012/0206457 | A1 | 8/2012 | Crocker |
| 2013/0120383 | A1 | 5/2013 | Joshi et al. |
| 2013/0124149 | A1 | 5/2013 | Carr et al. |
| 2013/0271459 | A1 | 10/2013 | Crocker |
| 2014/0267268 | A1 | 9/2014 | Tipton |

FOREIGN PATENT DOCUMENTS

| | | |
|---|---|---|
| EP | 1 881 458 A1 | 1/2008 |
| EP | 1 883 020 A1 | 1/2008 |
| JP | 2001-067491 A | 3/2001 |
| WO | 01/08102 A1 | 2/2001 |
| WO | 03/098477 A1 | 11/2003 |
| WO | 2004/088468 A2 | 10/2004 |

OTHER PUBLICATIONS

Fowler et al., "Constraint-Based Curve Manipulation" (Sep. 1993), IEEE Computer Graphics and Applications, vol. 13, Issue 5, pp. 43-49 [retrieved from http://ieeexplore.ieee.org/abstract/document/232098/].*

Lindstrom, M., "Penalized Estimation of Free-Knot Splines" (Jun. 1999), Journal of Computational and Graphical Statistics, vol. 8, No. 2, pp. 333-352 [retrieved from http://www.statucla.eduk~cocteau/stat204/readings/lindstrom1.pdf].*

Extended European Search Report dated Jul. 8, 2015 in Application No. 15305153.7.

Tony DeRose, Michael Kass, Tien Truong, "Subdivision Surfaces in Character Animation," Jul. 1998, Proceedings of the 25th Annual Conference on Computer Graphics and Interactive Techniques. p. 85-94.

Ying, L. et al., "Nonmanifold Subdivision," Proceedings of the Conference Visualization '01, San Diego, California, pp. 325-331, 359 (2001).

Biermann, H., et al., "Sharp Features on Multiresolution Subdivision Surfaces," Computer Graphics and Applications, Proceedings. Ninth Pacific Conference, IEEE: 140-149 (2001).

Havemann et al. "A versatile 30 Model Representation for Cultural Reconstruction". Published 2001.

Havemann et al. "Progressive Combined BReps-Multi-Resolution Meshes for Incremental Real-Time Shape Manipulation". Pub. 2003.

Bolz et al. "Rapid Evaluation of Catmull-Clark Subdivision Surfaces", published 2002.

Boier-Martin et al. "Differentiable Parameterization of Catmull-Clark Subdivision Surfaces". Published 2004.

Cotrina-Navau, J., et al., "A Generic Approach to Free Form Surface Generation," Proceedings of the Seventh ACM Symposium on Solid Modeling and Applications, section 7.2:35-44 (2002).

Zorin D. et al.: "Interpolating Subdivision for Meshes with Arbitrary Topology", Computer Graphics Proceedings 1996 (Siggraph), New Orleans, Aug. 4-9, 1996; Graphics Proceedings (Siggraph), New York, NY ACM, US, Aug. 4, 1996 (Aug. 4, 1996), pp. 189-192, XP000682735.

Mandal C. et al.: "A Novel Fem-based Dynamic Framework for Subdivision Surfaces", Computer Aided Design, Elsevier Publishers Bv., Barking, GB, vol. 32, No. 8-9, Aug. 1, 2000 (2000-0S-01), pp. 479-497, XP004203522 ISSN: 0010-4485.

Loop C.: "Second Order Smoothness Over Extraordinary Vertices", Eurographics Symposium on Geometry Processing, Eurographics Association, U.S., vol. 71, Jan. 1, 2004 (Jan. 1, 2004), pp. 165-174, XP007901487.

Prautzsch H. et al.: "A Gel> and A Gc2> Subdivision Scheme for Triangular Nets", International Journal of Shape Modeling, World Scientific, Singapore, 5G, vol. 6, No. 1, Jun. 1, 2000 (Jun. 1, 2000), pp. 21-35, XP007910137 ISSN: 0218-6543.

Peters J.: "Cc2> Free-form Surfaces of Degree (3,5)", Computer Aided Geometric Design, North-Holland, vol. 19, No. 2, Feb. 1, 2002 (Feb. 1, 2002), pp. 113-126, XP007910102 ISSN:0167-8396.

Zorin D., "Classical subdivision surfaces II", Lecture No. 15 of course CS448 Topics in Computer Graphics Mathematical Methods for Computer Graphics, Dec. 1997, Stanford University (retrieved at http://graphics.stanford.edu/courses/cs44897fall/notes/lect15.ps).

Catmull E. and Clark J.: "Recursively generated B-spline surfaces on arbitrary topological meshes", Computer-Aided Design, 10:350-355, Jul. 1978.

J. Stam: "Exact Evaluation of Catmull-Clark Subdivision Surfaces at Arbitrary Parameter Values", Proceedings of SIGGRAPH 1998, pp. 395-404, Jul. 1998.

Jorg Peters: "Patching Catmull-Clark Meshes", University of Florida.

Henning Biennanny, Joana Martin, Fausto Bernardini, and Denis Zorin: "Cut-and-Paste Editing of Multi-resolution Surfaces", Proceedings of ACM SIGGRAPH 2002, vol. 21 Issue 3, Jul. 2002, pp. 312-321.

Won-Seek Lee, In-Ho Song and Sung-Chong Chung: "3D Reconstruction for the 3D engraving system from 2D images", ASPE Proceedings, Oct. 19-Oct. 24, 2008, Portland, Oregon.

Rick Leung, Stephen Mann: "Distortion Minimization and Continuity Preservation in Surface Pasting", Graphics Interface, p. 193-200, 2003.

Steven W. Smith : "The Scientist and Engineer's Guide to Digital Signal Processing".

D. Terzopoulos, H. Qin; "Dynamic NURBS with Geometric Constraints for Interactive Sculpting", ACM Transactions on Graphics, 13(2), Apr. 1994, 103-136.

(56) References Cited

OTHER PUBLICATIONS

S.M. Hu, Y.F. Li, T. Ju, X. Zhu : "Modifying the shape of NURBS surfaces with geometric constraints", Computer Aided Design, 33 (2001) 903-912.
Hermann, T. et al., "Geometrical Criteria on the Higher Order Smoothness of Composite Surfaces", Computer Aided Geometric Design, vol. 16, No. 9, pp. 907-911. Oct. 1999.
Hughes, H., et al. "Piecewise Smooth Surface Reconstruction" SIGGRAPH 94 Conference Proceedings, pp. 295-302; Jul. 24, 1998.
Pernot, J-P, et al. "A Shape Deformation Tool to Model Character Lines in Early Design Phases" Proceedings SMI, Shape Modeling International, IEEE Computer Soc. , pp. 165-276; 2002.
Office Action dated Aug. 2, 2016 in European Application No. 06291190.4.
Krishnamurthy, V., et al.. "Fitting Smooth Surfaces to Dense Polygon Meshes" Computer Science Department, Stanford University, XP-002388348, pp. 1-12.

\* cited by examiner

3D MODELED OBJECT DEFINED BY A GRID OF CONTROL POINTS

CROSS-REFERENCE TO RELATED APPLICATIONS

This application claims priority under 35 U.S.C. § 119 or 365 to European Application No. 14307166.0, filed Dec. 23, 2014. The entire teachings of the above application(s) are incorporated herein by reference.

FIELD OF THE INVENTION

The invention notably relates to the field of computer-aided design (CAD), and more particularly to a method, program and system for designing a 3D modeled object by graphical user-interaction.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise.

The PLM solutions provided by DASSAULT SYSTEMES (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

CAD often involves surfaces for representing 3D modeled objects. Surface modeling is used notably in styling design, including class A design, where motivations include the aesthetic aspect of a manufactured product. Typical surfaces are provided by the mathematics of Bezier, B-Spline and more generally NURBS (non-uniform rational B-spline) curves and surfaces models. All these models provide the very popular concept of "control points". The surface is defined by a grid of points and moving these points appropriately changes the shape of the surface. Typical references are:
    The NURBS book, L. Piegl, W. Tiler, Springer Science, 1997; and
    Curves and surfaces for computer aided geometric design: a practical guide, G. Farin, Hardcover, 1996.
    Existing systems aim at allowing easy interactive manipulations by the user, for modification of the surface. By definition, an easy manipulation is intuitive and predictable, meaning that a beginner rapidly understands how to change the shape of a surface and that a skilled user can anticipate the surface resulting from the manipulation.

Some methods for shaping NURBS surfaces involve geometric constraints or physical behavior. Geometric constraints methods compute new control points so that the deformed surface meets the user defined geometry (point, set of points, curve). Physical behavior is for the user to apply forces on the surface that behaves like an elastic material. References include:
    Dynamic NURBS with Geometric Constraints for Interactive Sculpting, D. Terzopoulos, H. Qin, ACM Transactions on Graphics, 13(2), April 1994, 103-136; and
    Modifying the shape of NURBS surfaces with geometric constraints, S. M. Hu, Y. F. Li, T. Ju, X. Zhu, Computer Aided Design, 33 (2001) 903-912.

Within this context, there is still a need for an improved solution to design a 3D modeled object.

SUMMARY OF THE INVENTION

It is therefore provided a computer-implemented method for designing a 3D modeled object. The method comprises the step of providing, to a computer system, a NURBS surface that represents the 3D modeled object and that is defined by a grid of control points. The method also comprises determining, by the computer system, a grid of surface points that belong to the NURBS surface. The grid of surface points corresponds to the grid of control points according to a predetermined invertible function. The method also comprises displaying, by the computer system, the NURBS surface and, on the NURBS surface, the grid of surface points. The method also comprises selecting, by graphical user-interaction, a subset of the surface points. The method also comprises modifying, by graphical user-interaction, position of the selected subset of surface points, and accordingly, updating real-time, by the computer system, the surface, the update being performed according to the predetermined invertible function.

The method may comprise one or more of the following:
    the grid of surface points is the grid of Gréville points;
    the updating of the grid of control points is performed by optimizing a program that penalizes geometrical deformation of the NURBS surface, under the constraint that the position of the selected subset of surface points be as modified;
    the program penalizes geometrical deformation of the NURBS surface by penalizing, for each respective control point, a distance between the respective control point before the update and the respective control point after the update;
    the program penalizes, for each respective control point, the distance between the respective control point before the update and the respective control point after the update with a weight that is an increasing function of the distance between the surface point that corresponds to the respective control point and the selected subset of surface points;
    the method further comprises parameterizing, by graphical user-interaction, the increasing function
    the increasing function is an indicator function equal to 1 for each respective control point that corresponds to a surface point in the selected subset of surface points, to a first predetermined number strictly higher than 1 for each other respective control point that corresponds to a surface point that belongs to a largest square in the grid of surface points centered on a selected non-corner surface point, or to a surface point that belongs to the quarter of the grid of surface points containing a selected corner surface point, and to a second predetermined number higher than ten times the first predetermined number for each other respective control point;

the method comprises setting, by graphical user-interaction, the first predetermined number;

the program is a convex energy depending on the control points respectively after the update and before the update;

the program is of the type $$\sum_{i=0}^{n}\sum_{j=0}^{m}\mu_{ij}\|P_{ij}-Q_{ij}\|^2$$

where $P_{ij}$ and $Q_{ij}$ are the control points respectively after the update and before the update;

the program is solved with a Lagrange solving;

the Lagrange solving comprises determining the parameters of an affix function that takes the position of the selected subset of surface points as input and that outputs the updated control points, and then applying the affix function to the position of the selected subset of surface points as modified; and/or the step of modifying position of the selected subset of surface points and updating the grid of control points is iterated, with the same selected subset of surface point, the parameters of the affix function being computed and stored at the initial iteration and then retrieved throughout subsequent iterations.

It is further provided a computer program comprising instructions for performing the method.

It is further provided a computer readable data storage medium having recorded thereon the computer program.

It is further provided a CAD system comprising a processor coupled to a memory and a graphical user interface, the memory having recorded thereon the computer program.

It is further provided a method for manufacturing an industrial product, comprising the steps of designing a three-dimensional object that represents the industrial product according to the above design method, and then manufacturing the industrial product based on the designed three-dimensional object.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 1:
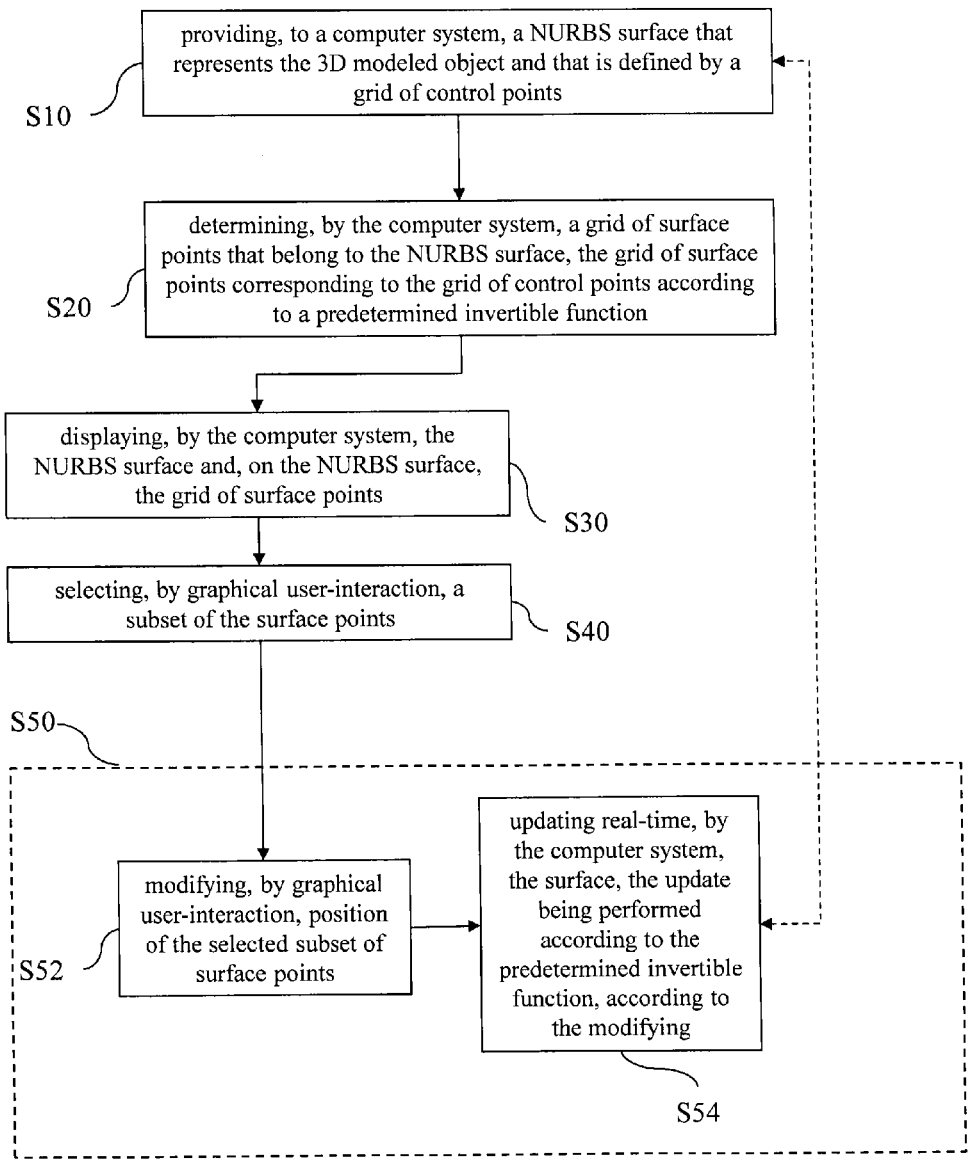
FIG. 1 shows a flowchart of an example of the method.

With reference to the flowchart of FIG. 1, it is proposed a computer-implemented method for designing a 3D modeled object. The method comprises a step S10 of providing, to a computer system, a NURBS surface (e.g. a Bézier surface). The NURBS represents the 3D modeled object (e.g. the 3D modeled object representing—geometrically—at least part of the outer boundary/envelop of an industrial product, such as a mechanical part, e.g. a camera) and is defined, as known per se, by a grid of control points. The method also comprises a step S20 of determining, by the computer system, a grid of surface points that belong to the NURBS surface. The grid of surface points determined at S20 corresponds to the grid of control points according to a predetermined invertible function (e.g. the evaluation of the NURBS surface at a given couple of parameters). The computer system may maintain said predetermined invertible function, or rules from which said predetermined invertible function can be derived, such that it may perform S20 anytime. This is known as such from the field of CAD, where developers know how to implement mathematical schemes when provided with such (examples of the mathematical schemes applicable to the present situation being provided later). The method also comprises a step S30 of displaying (e.g. to a user, e.g. on a screen), by the computer system, the NURBS surface and, on the NURBS surface, the grid of surface points. The method then comprises a step S40 of selecting, by graphical user-interaction, a subset (e.g. any subset) of the surface points. The method then performs in a block S50 a step S52 of modifying, by graphical user-interaction, position of the selected subset of surface points. The method accordingly performs a step S54 of updating, real-time, by the computer system (e.g. automatically), the surface. The update is performed according to the modification performed at S52 (in a real-time and e.g. automatic and/or immediate reaction to said modification) and according to the predetermined invertible function. As shown on FIG. 1, the updating S54 may be reflected on the definition of the NURBS surface, and thereby replay S10, S20, S30 in a loop. At such point, S40 and/or S50 may of course be iterated again. This looping is obvious to the skilled computer scientist.

Such a method improves the design of a 3D modeled object. Notably, the method allows the modification of a NURBS surface, a widely used type of surface in the field of CAD and industrial design, by graphical user-interaction. The graphical user-interaction is easy because it consists of selecting points (at S40) and then modifying position of such points (at S52). Because the points selected at S40 and modified at S52 are surface points, the method allows a very intuitive graphical user-interaction, as the user can interact directly with the surface and modify geometry with a local manipulation (in contrast to solutions where the user has to manipulate control points of the NURBS, said control points not lying on the surface—unlike the manipulated points of the method). The method thus presents a "what you see is what you get" behavior. Furthermore, as the modification is performed on points related to the initial control points of the NURBS surface via a predetermined invertible function (e.g. which takes into account the locality and the amplitude of the input modification), the method is able to rely on such predetermined invertible function to reflect the modification on the surface (at S54), thereby maintaining the initial topology of the surface and the user intent (notably in case the surface was previously designed by a user). Indeed, the method does not delete control points nor does it add control points. The method only modifies control points, and may leave any other data defining the surface untouched. From a user point of view, the surface is not replaced but only modified. This preserves the detail density and the intrinsic mathematical definition of a given NURBS surface. The user thereby understands the modification and the resulting surface better.

Also, the system may provide in examples for the selection at S40 of any number of point(s), e.g. in any configuration, such that the method allows fast and flexible modification operations. Notably, several surface points, e.g. not on the same row/column of the grid, e.g. not necessarily topologically adjacent on the grid of surface points (i.e. not necessarily neighbours on the grid), may be selected and modified. The modification may be performed in any way, e.g. not necessarily in a homogenous way on the selected surface points. In examples, the method, notably S54, performs in linear time, thereby being highly responsive and thus user-friendly. In examples, the method limits introduction of oscillations induced by the modification, thereby providing a more intuitive result.

The method is computer-implemented. Steps of the method are indeed executed on a computer system, by the computer system alone or by graphical user-interaction (i.e. a user interacting with a GUI of the computer system). Thus, steps performed specifically by the computer system may be performed fully automatically. In examples, the triggering of at least some of the steps of the method may be performed through user-computer interaction. Notably, the providing S10 may be performed or triggered by the user. The level of user-computer interaction required may depend on the level of automatism foreseen and put in balance with the need to implement the user's wishes. In examples, this level may be user-defined and/or pre-defined.

A typical example of computer-implementation of the method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

The method generally manipulates modeled objects. A modeled object is any object defined by data stored in the database. By extension, the expression "modeled object" designates the data itself. "Designing a 3D modeled object" designates any action or series of actions which is at least part of a process of elaborating a 3D modeled object. Thus, the method may comprise creating the 3D modeled object from scratch. Alternatively, the method may comprise providing a 3D modeled object previously created, and then modifying the 3D modeled object.

According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD system, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing or modeling process.

The 3D modeled object may represent the geometry of a product to be manufactured in the real world subsequent to the completion of its virtual design with for instance a CAD software solution or CAD system, such as a (e.g. mechanical) part or assembly of parts, or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore or transportation. The 3D modeled object designed by the method thus represents an industrial product which may be a part of a terrestrial vehicle (including e.g. car and light truck equipment, racing cars, motorcycles, truck and motor equipment, trucks and buses, trains), a part of an air vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging). The method is particularly useful where aesthetic aspects of the 3D modeled object are of high importance. This is true when the 3D modeled object represent a vehicle or a plane mechanical part, such as visible part, or a consumer good (e.g. an electronic good, such as a camera).

By PLM system, it is meant any system adapted for the management of a modeled object representing a physical manufactured product. In a PLM system, a modeled object is thus defined by data suitable for the manufacturing of a physical object. These may typically be dimension values and/or tolerance values. For a correct manufacturing of an object, it is indeed better to have such values.

CAM stands for Computer-Aided Manufacturing. By CAM solution, it is meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systèmes under the trademark DELMIA®.

CAE stands for Computer-Aided Engineering. By CAE solution, it is meant any solution, software or hardware, adapted for the analysis of the physical behavior of a modeled object. A well-known and widely used CAE technique is the Finite Element Method (FEM) which typically involves a division of a modeled object into elements which physical behaviors can be computed and simulated through equations. Such CAE solutions are provided by Dassault Systèmes under the trademark SIMULIA®. Another growing CAE technique involves the modeling and analysis of complex systems composed a plurality components from different fields of physics without CAD geometry data. CAE solutions allows the simulation and thus the optimization, the improvement and the validation of products to manufacture. Such CAE solutions are provided by Dassault Systèmes under the trademark DYMOLA®.

PDM stands for Product Data Management. By PDM solution, it is meant any solution, software or hardware, adapted for managing all types of data related to a particular product. A PDM solution may be used by all actors involved in the lifecycle of a product: primarily engineers but also project managers, finance people, sales people and buyers. A PDM solution is generally based on a product-oriented database. It allows the users to share consistent data on their products and therefore prevents actors from using divergent data. Such PDM solutions are provided by Dassault Systèmes under the trademark ENOVIA®.

Figure 2:
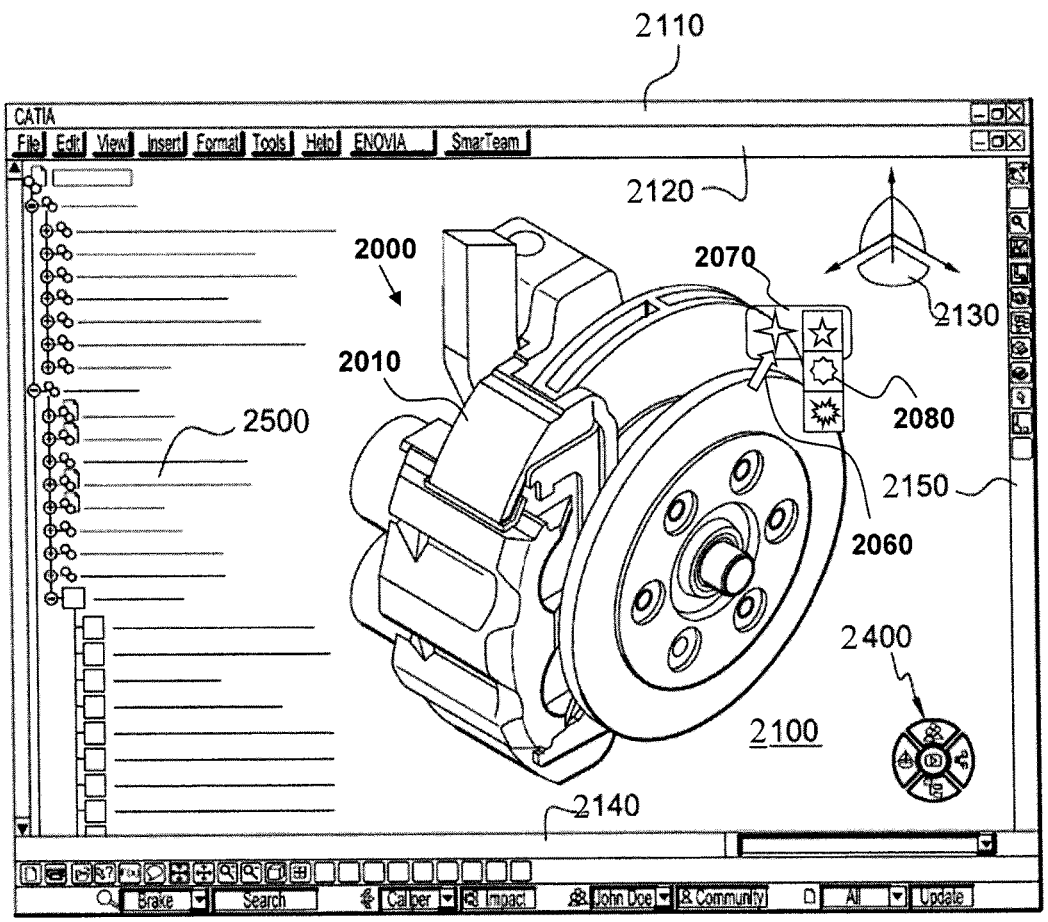
FIG. 2 shows an example of a graphical user interface of the system.

FIG. 2 shows an example of the GUI of the system, wherein the system is a CAD system.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100, displayed 3D modeled object 2000 being for example the result of performing the method. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen.

The GUI may for example display data 2500 related to the displayed product 2000. In the example of FIG. 2, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 3:
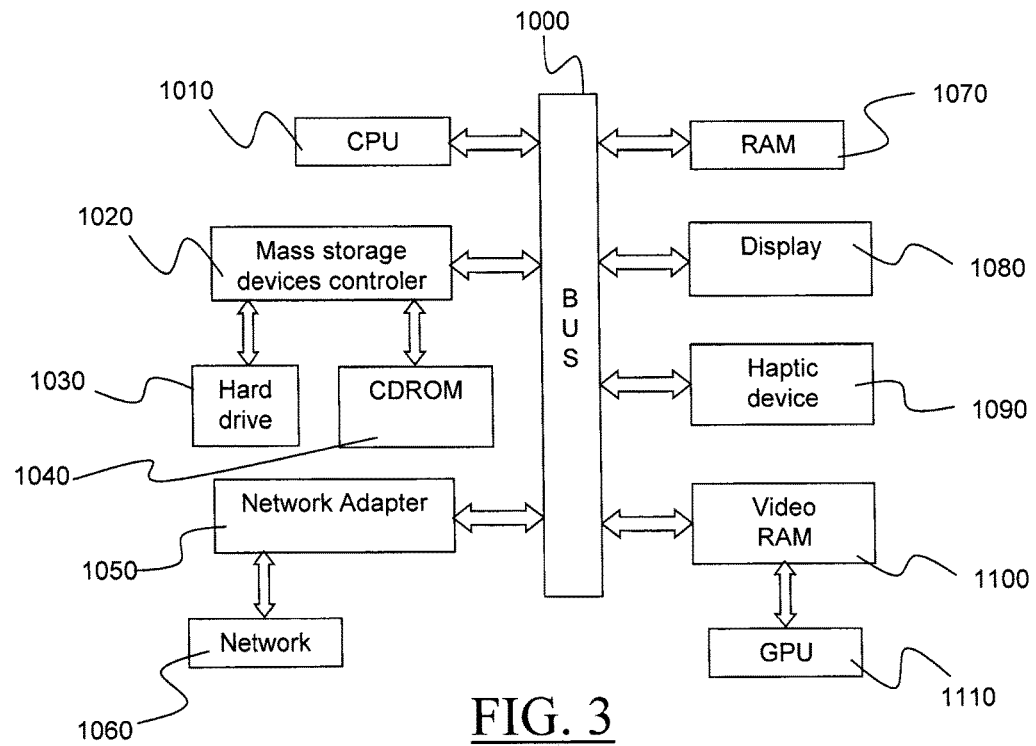
FIG. 3 shows an example of the system.

FIG. 3 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive/touch pad, and/or a sensitive/touch screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

An example of the method where the grid of surface points is the grid of so-called "Gréville" (or "Greville") points is now discussed. The Gréville points are the 3D points given by the evaluation of the NURBS surface at the Gréville abscissae. Moreover, the Gréville abscissae are the parameters of the control points of the NURBS surface. In a usual scenario where the NURBS surface has been designed by a specialist designer before S10, the Gréville points form a homogeneous polyhedron, with segments—between consecutive Gréville points on the grid—having a length of the same order (for example, plus or minus 20% relative to the means length, e.g. for at least 80% of the segments). The Gréville points thus convey the user-intent of the initial designer of the surface provided at S10, such that the manipulation of these points in particular makes the method particularly user-friendly. The grid of Gréville points reflects the grid of control points and the local densities of details the initial designer wanted to add to the model. Indeed, where the designer wanted to add details, the Gréville points have a higher local density compared to where the designer did not want such details. The method may thus prove particularly useful in a global process where the surface provided at S10 is prior to S10 designed by a human designer, with local zones presenting local shapes at several scales. The density of the Gréville points may be seen as the number of Gréville points of a zone divided by the surfacic area of the zone, and will in such a case be (statistically) higher in case of local zones presenting a high level details. As the grid of Gréville points is defined on iso-abscissae of the NURBS surface, border effects are limited.

The method allows the modification of a NURBS surface that represents the 3D modeled object (e.g. the boundary therefo). As known per se, a NURBS surface is defined by a (2D) grid of so-called "control points", with the usual topological definition of "grid", e.g. with several (at least two) rows and several (at least two) columns. Throughout the method, the computer system determines S20, a grid of surface points that belong to the NURBS surface and that corresponds to the grid of control points according to the predetermined invertible function. The surface points are points geometrically lying on/belonging to the surface. In the case of a NURBS, a straightforward grid of surface is the grid of Gréville points of the example. The predetermined invertible function that allows the one-to-one correspondence between surface Gréville points and control points (generally outside the surface itself) of a NURBS is predetermined and provided from the widely known mathematics describing NURBS geometry. These mathematics are however detailed hereunder for the sake of completeness. It is noted that the determining S20 may be performed in any way, e.g. as a background process that re-computes real-time the Gréville points each time the surface and its control points are modified.

A NURBS surface is a surface, widely used in CAD, defined in a 2D space with values in a 3D space: $S(u, v) \rightarrow (x, y, z)$. A NURBS surface is represented with two knot vectors and a 2-dimensional array of control points, and possibly other data depending on the CAD software used. Typically, the knot vectors are 1D arrays of floating point values. The array of control points may be indexed. Each control point is a 3D point with coordinates x, y, z. The place in the array is defined with the two indices i and j; with $0 \leq i < M$ and $0 \leq j < N$. A set of parameters known as the Gréville parameters can be computed from the knot vectors so that each value of the indices i or j can be associated to a Gréville parameter $(u_i, v_j)$. Traditionally, the Gréville parameters are a couple of means of a fixed number of consecutive values of the knot vector. This fixed number, called "degree", may be different for each dimension (u or v) of the knot vector. In general, a couple of degrees belong to the data representing the NURBS surface. For more details, the article "Curves and surfaces for Computer Aided Geometric Design", ed. Morgan Kaufmann, (2001) by Gerald FarM provides the basics of NURBS surfaces.

Classically, a NURBS surface is defined by the following inputs.
1. A grid of $(n+1)$ $(m+1)$ control points $P_{ij} \in \mathbb{R}^3$ with $i \in \{0, \ldots, n\}$ and $j \in \{0, \ldots, m\}$.
2. Two positive integer numbers p, q named the "degrees" for some reasons explained later.
3. A first ordered list of real numbers $u_0 \leq \ldots \leq u_i \leq u_{i+1} \leq \ldots \leq u_{p+n+1}$ named the "u knot vector" such that the first p+1 values $u_i$ are equal and such that the last p+1 values $u_i$ are equal.
4. A second ordered list of real numbers $v_0 \leq \ldots \leq v_j \leq v_{j+1} \leq \ldots \leq v_{q+m+1}$ named the "v knot vector" such that the first q+1 values $v_j$ are equal and such that the last q+1 values $v_j$ are equal.
5. A grid of $(n+1)$ $(m+1)$ weight numbers $\omega_{ij} > 0$ with $i \in \{0, \ldots, n\}$ and $j \in \{0, \ldots, m\}$.

These inputs define two B-spline basis, respectively noted $N_i^p : [u_0, u_{p+n+1}] \rightarrow \mathbb{R}^+$ with $i \in \{0, \ldots, n\}$ and $N_j^q : [v_0, v_{q+m+1}] \rightarrow \mathbb{R}^+$ with $j \in \{0, \ldots, m\}$. Basis B-spline functions $N_i^p$ and $N_j^q$ are piecewise polynomial with respective degrees p and q. Their detailed definition is not useful to the invention. The NURBS surface $S: [u_0, u_{p+n+1}] \times [v_0, v_{q+m+1}] \rightarrow \mathbb{R}^3$ is defined by the following rational parameterization.

$$S(u, v) = \frac{1}{\sum_{i=0}^{n} \sum_{j=0}^{m} \omega_{ij} N_i^p(u) N_j^q(v)} \sum_{i=0}^{n} \sum_{j=0}^{m} \omega_{ij} P_{ij} N_i^p(u) N_j^q(v)$$

Similarly, a NURBS curves $C: [t_0, t_{p+n+1}] \rightarrow \mathbb{R}^3$ is defined by a degree p a list of n+1 control points $P_i$ and weights $\omega_i$ involved in the following formula.

$$C(t) = \frac{1}{\sum_{i=0}^{n} \omega_i N_i^p(t)} \sum_{i=0}^{n} \omega_i P_i N_i^p(t)$$

In fact, from the mathematical point of view, a NURBS surface is the tensor product of two NURBS curves. For clarity, the method is mainly illustrated (on the following figures) with NURBS curves rather than NURBS surfaces.

Gréville points are now discussed.

Gréville abscissas are particular values of (u, v) parameters noted $(u^*_k, v^*_l)$ with $k \in \{0, \ldots, n\}$ and $l \in \{0, \ldots, m\}$. They are uniquely defined by the following formulas.

$$u_k^* = \frac{1}{p} \sum_{\sigma=k}^{k+p-1} u_\sigma$$

$$v_l^* = \frac{1}{q}\sum_{\sigma=l}^{l+q-1} v_\sigma$$

In other words, a Gréville abscissa is the average value of p (resp. q) consecutive values of the knot vector. The point on the surface that is mostly influenced by control point $P_{kl}$ is the so-called Gréville point $S(u^*_k, v^*_l)$. In some way, Gréville points disclose the influence of control points on the surface. Noting $G_{kl}=S(u^*_k, v^*_l)$ the Gréville points, and according to the definition of the NURBS surface, the relationship between Gréville points and control points is defined by the following linear formula (and this is a possible formulation of the "predetermined invertible function").

$$G_{kl} = \sum_{i=0}^{n}\sum_{j=0}^{m} a_{ijkl} P_{ij}$$

$(k, l) \in \{0, \ldots, n\} \times \{0, \ldots, m\}$ with $$a_{ijkl} = \frac{\omega_{ij} N_i^p(u_k^*) N_j^q(v_l^*)}{\sum_{\bar{i}=0}^{n}\sum_{\bar{j}=0}^{m} \omega_{\bar{i}\bar{j}} N_{\bar{i}}^p(u_k^*) N_{\bar{j}}^q(v_l^*)}$$

A more convenient formula is obtained by noting G the row vector of all coordinates of all Gréville points:

$G=(G_{kl})_{(k,l)\in\{0,\ldots,n\}\times\{0,\ldots,m\}} \in \mathbb{R}^{3(n+1)(m+1)}$ and P the row vector of all coordinates of all control points:

$P=(P_{ij})_{(i,j)\in\{0,\ldots,n\}\times\{0,\ldots,m\}} \in \mathbb{R}^{3(n+1)(m+1)}$ Then, previous formula defines a linear transformation A: $\mathbb{R}^{3(n+1)(m+1)} \to \mathbb{R}^{3(n+1)(m+1)}$ such that

G=AP

And

P=A⁻¹G

Linear transformation A is a squared $(3(n+1)(m+1)) \times (3(n+1)(m+1))$ matrix, and, according to prior art, it is invertible (if every Greville point is selected once—if not a given row in the matrix appears twice).

Figure 4:
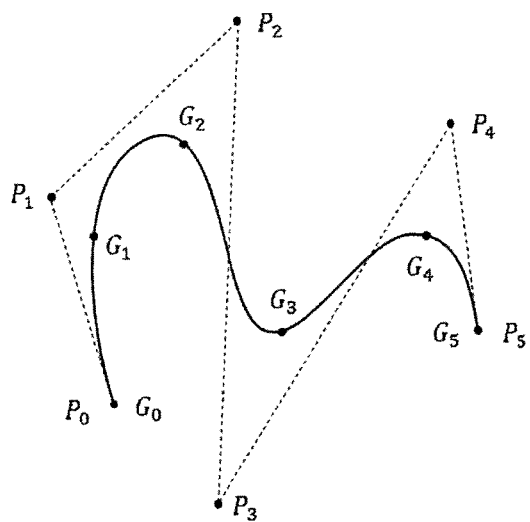
FIGS. 4-17 illustrate the method.

FIG. 4 illustrates a NURBS curve together with its n+1=6 control points $P_i$ and Gréville points $G_i$.

Now the method allows the modification of the surface via user-interaction. For that, the computer system displays S30 the NURBS surface and, on the NURBS surface, the grid of surface points. The displaying S30 may here again be performed as a background process, e.g. throughout the whole method (e.g. throughout iterations of the method, for example, for performing modifications). The displaying S30 may be performed in any classical way of displaying surfaces in CAD, e.g. by highlighting boundaries of the surfaces and shading the surfaces. The grid of points are displayed typically as—e.g. highlighted, such as bold—bullets or squares on a display device of the computer system (e.g. a screen), and they are displayed lying on the graphical representation of the surface. Any other graphical representation may be used, as long as the user is provided with a visual representation of the surface and grid of surface points (Gréville points in the example) on the surface.

The user may then select at S40, by graphical user-interaction, a subset of the surface points. The graphical user-interaction may be performed in any way. Typically, the user launches a selection function and then interacts with the representations of the displayed Gréville points, for example with a cursor, a touchpen, or his/her finger(s). Alternatively, the user may directly interact with the displayed graphical representations of the Gréville points (without launching a function). As mentioned earlier, the computer system may provide for selection at S40 substantially simultaneously of any subset of surface points, including several surface points not on the same row or column of the grid. Indeed, the user may want to move several points with a same distance from a reference geometry, and the method may thereby provide for the achievement of this action in one single operation. The user may for example pick surface points one after the other.

The user can then modify at S52, by graphical user-interaction, position of the selected subset of surface points. This may be performed in any way, for example by a drag-and-drop operation. The drag-and-drop may continuously follow the selection S40. For example, the user can click, touch or double click or double touch displayed surface point(s). Then the user can perform a clicking/touching drag-and-drop of the whole selection. The system interprets such operation as a modification of the position of the surface points, the interpretation being performed in any classical way.

Accordingly to this whole graphical user-interaction with the computer system, the method updates S54 real-time, e.g. automatically by the computer system, the surface. The update S54 is performed according to the predetermined invertible function, i.e. maintaining the mathematical link between the position of the Gréville points and the definition of the NURBS, that is, position of the control points. All other above-mentioned data defining the NURBS may be left untouched, thereby preserving user-intent (as discussed earlier). The implementation of the update S54 follows from the mathematical explanations provided above. The update S54 thereby modifies the surface (by modifying position of the control points) and thus the display S30, while maintaining the initial structure of the NURBS surface (for knot vectors are not modified at all) and thus user-intent. The operation may be iterated as many times as wanted by the user, being noted that how the iterations are handled, and questions of validating and/or canceling modifications are implementation details.

The drawback of traditional models is that the control points are not located on the surface. They define a grid that is away from the surface, so that editing the surface is an indirect process: move a control point, check the change of the surface, if needed, move the control point again and so on. Physics-based methods involve force application and undergo the same drawback because the user needs to adjust the magnitude and the locus of the force, which is, in fact, an indirect manipulation. It should be noted that deforming a surface by applying forces is sometimes named "direct manipulation", but that this is improper, because the user does not really deal with points on the surface. Furthermore, physics-based methods involve non-linear differential equation solving and over-determined conflicting constraints, which may be computing time consuming. Control points are widely used in the CAD industry, but the ability to change the shape of a surface by moving points located on the surface through a direct editing process is advantageous.

The method of the example allows direct deformation of NURBS surfaces by using Gréville points, which, by nature, are located on the surface. Furthermore, through a smoothing process and by involving neighboring geometry, the method in another example discussed later avoids unwanted effects of Gréville points edition. As opposed to prior art, the method allows direct deformation by picking points on the surface, and not by picking some external geometry. This direct deformation is made smooth and fluent so that the intuitive behavior of the very popular control points is preserved. The mathematical solving is based on linear equations, which makes the geometrical update very fast and reliable, as in examples provided later. This improves styling design productivity.

Figure 5:
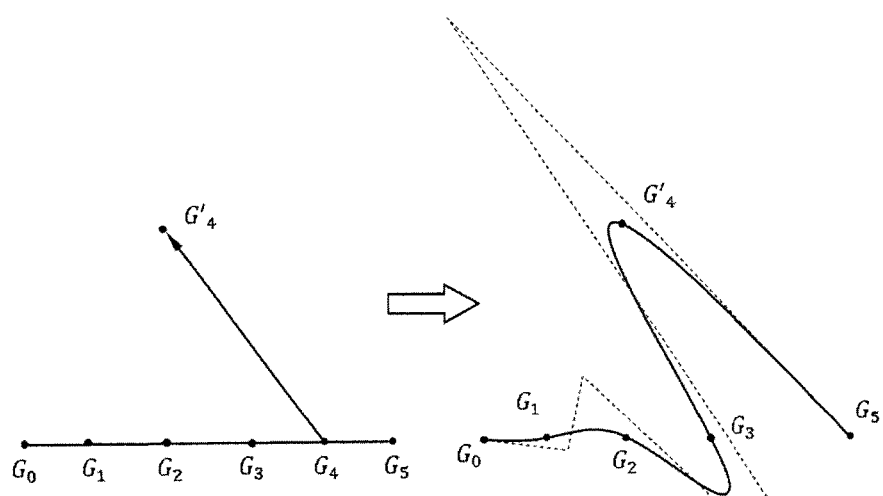

The straightforward solution is to let the user change the positions of Gréville points G into G' and to compute the new control points P' by using $P'=A^{-1}G'$. Experiments performed by the Inventors show that unwanted oscillations are created on the surface by this solution, as illustrated on FIG. 5. The left part is a horizontal NURBS curve defined by six control points (that are not illustrated). Dots are the Gréville points of the curve. Gréville point $G_4$ is moved to $G'_4$. The right part illustrates the resulting NURBS curve featuring unexpected oscillations. Dotted polyline is the control polygon of the NURBS curve. This side effect is the reason why Gréville points are traditionally not used to manipulate NURBS surfaces. The problem comes from the following misconstruction. In real life, the user does not change all Gréville points at the same time, but the formula $P'=A^{-1}G'$ translates the request: take into account the Gréville points selected by the user and keep unchanged all other Gréville points. Keeping unchanged unselected Gréville points makes the solution so tricky.

The method may alleviate this issue by performing a so-called "relaxation". The idea is to free the Gréville points that are not selected by the user. Thanks to this degree of freedom, unselected control points are displaced yielding the user's expected smooth behavior. In specific, the updating S54 of the grid of control points may be performed by optimizing a program that penalizes deformation of the NURBS surface, under the (e.g. unique) constraint that the position of the selected subset of surface points be as modified (i.e. as requested by the user at S52). In other words, the updating S54 ensures only that the Gréville points selected and moved by the user be in fine as the user moved them, while minimizing the overall deformation of the NURBS's geometry—by moving unselected Gréville points if necessary—(generally speaking, a program that tends to that aim is optimized with adequate penalization terms, as known from the field of applied mathematics). Thus, unselected Gréville points are freed, or "relaxed" when performing S54.

The criterion retained to penalize the deformation of the NURBS surface is any predetermined mathematical criterion fulfilling such function. In an example, the program penalizes, for each respective control point, a distance between the respective control point before the update and the respective control point after the update. Any distance may be used, for example the Euclidian distance (or any such distance that induces an energy which is convex, which ensures unicity of the solution). In other words, the program "presses" control points after the update S54 toward their original position, as much as possible (while respecting the constraint imposed by the user of course). This allows fast computations.

Let $Q_{ij}$ be the control points of the initial surface, which is the surface before the user starts the deformation. Let $\tilde{G}=(G_{kl})_{(k,l)\in V}$ where $V \subset \{0, \ldots, n\}\times\{0, \ldots, m\}$ be the Gréville points selected by the user. Notice that not all the Gréville points are necessarily selected at the same time (although this is also possible, in which case $P=A^{-1}G$), meaning that $V \neq \{0, \ldots, n\}\times\{0, \ldots, m\}$. The smoothing principle of the example is to compute the new control points $P_{ij}$ as close as possible to initial control points $Q_{ij}$.

From the mathematical point of view, the sum of the squared distances between initial and new control points may in an example be minimized as such:

$$\sum_{i=0}^{n}\sum_{j=0}^{m}\|P_{ij} - Q_{ij}\|^2$$

under the (linear) constraint that the new control points $P_{ij}$ are compliant with the changed Gréville points, that is:

$$G_{kl} = \sum_{i=0}^{n}\sum_{j=0}^{m} a_{ijkl} P_{ij}$$

$$(k, l) \in V$$

It is first noted that this sum can be regarded as the weighted sum mentioned later, where all weights are equal to 1.

Notice also that the previous linear system features $3(n+1)(m+1)$ scalar unknowns (the coordinates of control points $P_{ij}$) and $3|V|$ scalar equations, where $|V|$ denotes the number of elements of set V. Since not all Gréville points are selected, $|V|<(n+1)(m+1)$. Consequently, the previous linear system features more unknowns than equations. It can be written $\tilde{G}=\tilde{A}P$ where $\tilde{A}$ is a linear transformation $\tilde{A}: \mathbb{R}^{3(n+1)(m+1)} \to \mathbb{R}^{3|V|}$.

The mathematical problem is now the minimization of a quadratic objective function under a linear constraint. Again, let Q be the row vector of all coordinates of all initial control points:

$$Q=(Q_{ij})_{(i,j)\in\{0,\ldots,n\}\times\{0,\ldots,m\}} \in \mathbb{R}^{3(n+1)(m+1)}$$

Standard mathematical formulation is as follows, where P is the unknown, Q and $\tilde{G}$ are input vectors and $\tilde{A}$ is an input matrix.

$$P = \underset{\tilde{A}P-\tilde{G}=0}{\operatorname{Argmin}} \frac{1}{2}\|P - Q\|^2$$

Figure 6:
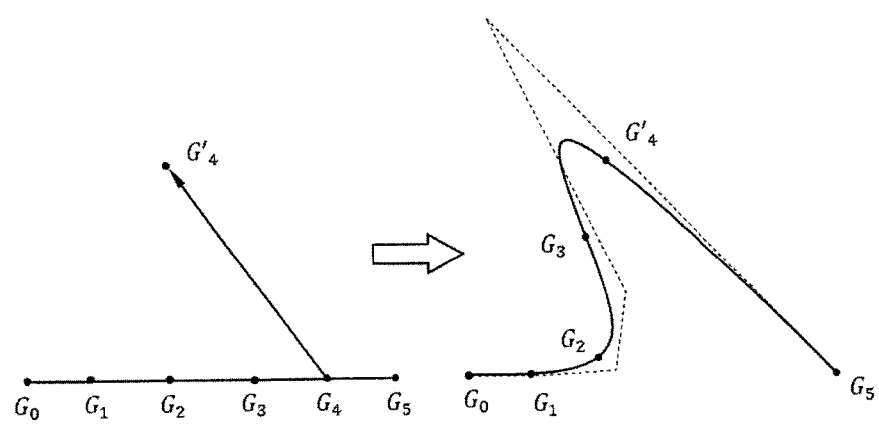

FIG. 6 illustrates the NURBS curve resulting from the following sequence: (1) the user selects Gréville points $G_4$ and $G_5$, (2) the user moves point $G_4$ to $G'_4$. From the system point of view, selected Gréville point $G_5$ is set fix and unselected Gréville points $G_1$, $G_2$ and $G_3$ are moved in order to ensure a non-oscillating curve fitting $G'_4$ and $G_5$. Dotted polyline is the control polygon of the NURBS curve.

The program may be efficiently solved with a Lagrange solving. This allows a linear-time solving. Indeed, the Lagrange solving may as known per se comprise determining the parameters of an affix function, said affix function taking the position of the subset of surface points selected at S40 as input and said affix function outputting the updated control points. The method may then apply the affix function to the position of the selected subset of surface points as modified, thereby to output in linear-time the result.

The Lagrange solving in particular allows a decomposition of the solving in sub-steps, the result of some of which may be re-used to gain efficiency, thus improving the responsiveness. The step of modifying S52 position of the selected subset of surface points and updating S54 the grid of control points may indeed be iterated with the same selected subset of surface point. In other words, the user selects at S40 a set of Gréville points, and then moves them in an iterated step-by-step operation (for example in a trial-and-error manner). The parameters of the affix function may in such a case be computed and stored at the initial iteration and then retrieved throughout subsequent iterations. This smart reuse of already computed matrices that optimizes graphical response, allowed by the Lagrange solving, is detailed below.

The symbolic resolution is a classical application of Lagrange multipliers. Computations are reproduced for consistency. For solving purpose only, the unknown Lagrange multiplier vector $\lambda \in \mathbb{R}^{3|\tilde{V}|}$ is introduced so that the Lagrange function of the problem is $$L(P, \lambda) = \frac{1}{2}\|P - Q\|^2 + \langle \lambda, \tilde{A}P - \tilde{G} \rangle$$

The equation of the problem is:

$$\frac{\partial L}{\partial P}(P, \lambda) = 0$$

$$\frac{\partial L}{\partial \lambda}(P, \lambda) = 0$$

Noting $\cdot^T$ the matrix transposition, partial derivatives of L are:

$$\frac{\partial L}{\partial P}(P, \lambda) = P - Q + \tilde{A}^T \lambda$$

$$\frac{\partial L}{\partial \lambda}(P, \lambda) = \tilde{A}P - \tilde{G}$$

Consequently, the linear system featuring unknowns P and $\lambda$ is:

$$P + \tilde{A}^T \lambda = Q$$

$$\tilde{A}P = \tilde{G}$$

The equivalent matrix-vector formulation:

$$\begin{pmatrix} I & \tilde{A}^T \\ \tilde{A} & 0 \end{pmatrix} \begin{pmatrix} P \\ \lambda \end{pmatrix} = \begin{pmatrix} Q \\ \tilde{G} \end{pmatrix}$$

being noted that the leftmost matrix of this expression is invertible because of the unicity of each Gréville point.

This system is solved as follows. Multiplying the first equation by $\tilde{A}$ yields $$\tilde{A}P + \tilde{A}\tilde{A}^T \lambda = \tilde{A}Q$$

$$\tilde{A}P = \tilde{G}$$

Then, by using the second equation $$\tilde{G} + \tilde{A}\tilde{A}^T \lambda = \tilde{A}Q$$

Matrix $\tilde{A}\tilde{A}^T$ is invertible according to prior art for the same reasons that make matrix A invertible. Consequently, $\lambda$ is computed:

$$\lambda = (\tilde{A}\tilde{A}^T)^{-1}(\tilde{A}Q - \tilde{G})$$

Finally, since $P = Q - \tilde{A}^T \lambda$, $$P = Q - \tilde{A}^T(\tilde{A}\tilde{A}^T)^{-1}(\tilde{A}Q - \tilde{G})$$

This can be arranged by separating the role of input data Q and G:

$$P = (I - \tilde{A}^T(\tilde{A}\tilde{A}^T)^{-1}\tilde{A})Q + \tilde{A}^T(\tilde{A}\tilde{A}^T)^{-1}\tilde{G}$$

Figure 7:
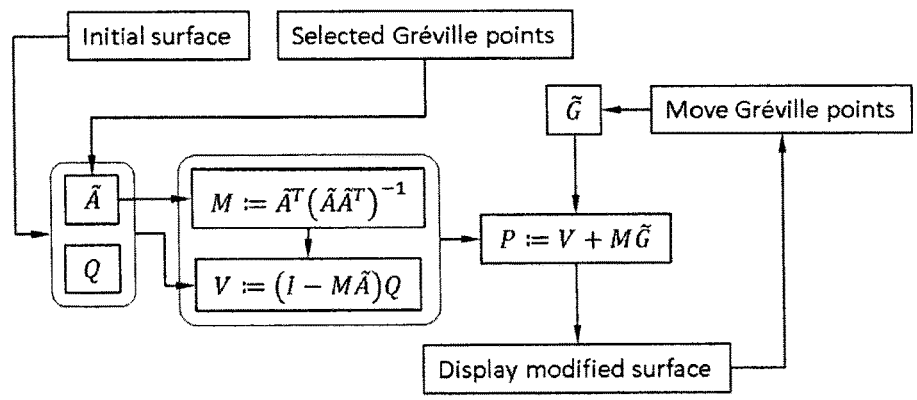

This way, when displaying real-time feedback for interactive application, the first term remains constant and only the second term needs to be updated. Once the NURBS surface and the Gréville points are selected, a first step computes matrix $M := \tilde{A}^T(\tilde{A}\tilde{A}^T)^{-1}$ and vector $V := (I - M\tilde{A})Q$. Matrix M and vector V remain unchanged during the Gréville points manipulation. Then, when the user moves selected Gréville points 6, the algorithm updates the control points P by computing $P := V + M\tilde{G}$. FIG. 7 illustrates the data flow of this example. It is noted that the size of square matrix $\tilde{A}\tilde{A}^T$ is proportional to the number of user-selected Gréville points, which is generally very small.

In another example, the program penalizes, for each respective control point, the distance between the respective control point before the update and the respective control point after the update with a (e.g. positive) weight that may generally be different from 1 (i.e. unlike in the example discussed above). The weight may be provided by the value of an increasing function of the distance between the surface point that corresponds to the respective control point and the selected subset of surface points. In other words, the (e.g. strictly) higher said distance, the (e.g. strictly) lower the weight. As earlier, non-selected surface points may freely move (relative to the request of the user, which is for the unselected Gréville points their initial position), but now with a freedom that "decreases" as the Gréville points are far from the selection performed at S40. The distance between a point and a set of points is defined and clear in mathematics. Here, the distance retained may for example be a Manhattan distance based on the grid of surface points. Such a solution leads to a more intuitive result. The method may even further comprise parameterizing, by graphical user-interaction, said increasing function. Thus, the user may interact graphically with the mathematics behind the updating S54. This may be performed via a specific widget provided by the system's GUI, such as a slider. This all allows a "user-controlled fine tuning".

In order to provide such control to the user, definitions of a so-called "influence area", a so-called "influence ratio" and so-called "regulation parameters" may be used by the method in an example. In this example of the method, the increasing function is an indicator function equal to 1 for each respective control points that corresponds to a selected Gréville point, to a first predetermined number (virtually a real number) higher than 1 for other control points corresponding to Gréville points inside the influence area (said first predetermined number being the 1/α detailed later in examples), and to a second predetermined number (virtually a real number) for (all) other control points (corresponding to Gréville points outside the influence area), the second number being at least higher than ten times the first predetermined number, but preferably virtually infinite (i.e. a number that has the function of preventing any moving of the control points weighted by such second number in the optimization program). For example, this influence area may in specific comprise (selected Gréville points and) all unselected Gréville points whose Manhattan distance to the selected subset of surface points, relative to (i.e. based on) the grid of surface points, is under a predetermined threshold. Another example, more refined and user-friendly, is however detailed later. The parameterizing by graphical user-interaction may be performed on the first predetermined number (by the above-mentioned slider). The computer system may handle all other parameters (i.e. the predetermined threshold and second numbers) in a predetermined way (e.g. the first predetermined number being for example related to said threshold parameter defining the influence area), to keep the burden on the user relatively low.

It must be noticed that the fine tuning could be implemented by other methods (typically by using convolution product of a Gaussian function). The weights could be defined as Cartesian products of Gaussian functions (which is a widely used technique in image processing). There would be two parameters in such a case (standard deviation and amplitude of the Gaussian), instead of the unique threshold parameter mentioned above. The weight would be related to the value of the 2D Gaussian at the Gréville abscissa corresponding to the respective control point. But the technique mentioned above and detailed hereunder gives good results from the user point of view.

In the following, $N_\infty$ is a constant very large number, typically, $N_\infty = 10^{12}$ and $$\varepsilon = \frac{1}{N_\infty}.$$

Figure 8:
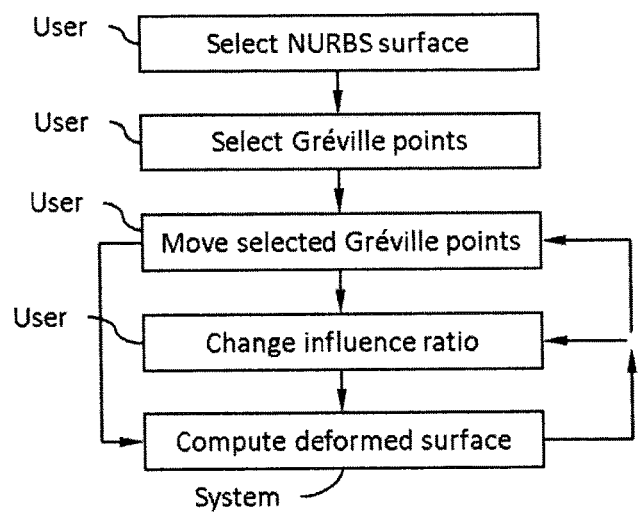

From user point of view, $\epsilon$ plays the role of zero. As an enhanced solution, the method provides in an example, in addition to Gréville points selection, a user-defined influence ratio to adjust the extent of the deformation. The slider may be provided for the influence ratio only, which may bijectively determine the above-mentioned thresholds. The influence area may be computed in a predetermined way. The method of the example may thus perform according to the flowchart of FIG. 8.

Influence Area

As mentioned above, the influence area may in a refined example consist of all the surface points that belong to a largest square in the grid of surface points centered on a selected non-corner surface point, or to a surface point that belongs to the quarter of the grid of surface points containing a selected corner surface point. This is detailed hereunder.

Let $T = \{(i, j) \in \{0, \ldots, n\} \times \{0, \ldots, m\}\}$ be the grid of Gréville points indexes and let $(j_0, j_0) \in \{0, \ldots, n\} \times \{0, \ldots, m\}$ be an arbitrary index. Roughly speaking, the influence zone/area of $(i_0, j_0)$, noted $Z(i_0, j_0)$, may be arbitrarily defined as the largest square centered at $(i_0, j_0)$ that can be included in T.

More precisely, let $\delta: \mathbb{R} \to \{0,1\}$ defined by $\delta(0) = 1$ and $\delta(x) = 0$ if $x \neq 0$. Let $$k_{min}(i, j) = \min\{\min\{i_0, n-i_0\}, \min\{j_0, m-j_0\}\}$$

And $$k_{max}(i, j) = \max\{\min\{i_0, n-i_0\}, \min\{j_0, m-j_0\}\}$$

Now, let $$k_1(i, j) = k_{min}(i, j) + \delta(k_{min}(i, j))k_{max}(i, j)$$

If $k_1(i_0, j_0) > 0$, meaning that $(i_0, j_0)$ is not a corner index of T, the influence area is:

$$Z(i_0, j_0) = \{(i_0+i, j_0+j); i, j \in \{-k_1(i_0, j_0), \ldots, k_1(i_0, j_0)\}\} \cap T$$

If $k_1(i_0, j_0) = 0$, meaning that $(i_0, j_0)$ is a corner index of T, the influence area is the quarter of the grid including $(i_0, j_0)$:

$$Z(i_0, j_0) = \left\{(i_0+i, j_0+j); i, j \in \left\{-\frac{1}{2}\min\{m, n\}, \ldots, \frac{1}{2}\min\{m, n\}\right\}\right\} \cap T$$

By definition, the influence area of a subset of indexes $(k, l) \in V$ is the union of all influence areas:

$$Z(V) = \bigcup_{(k,l) \in V} Z(k, l)$$

Figure 9:
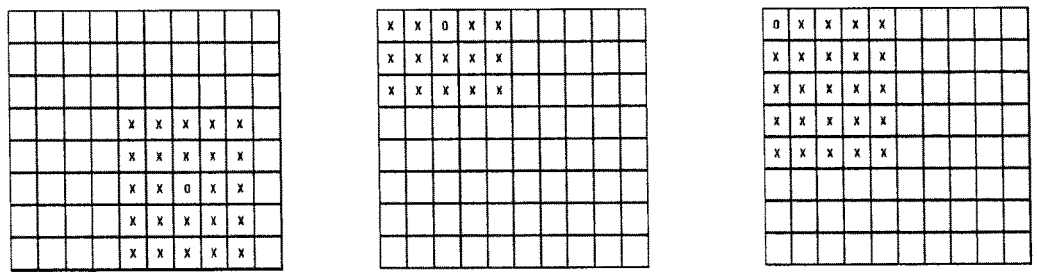
Figure 10:
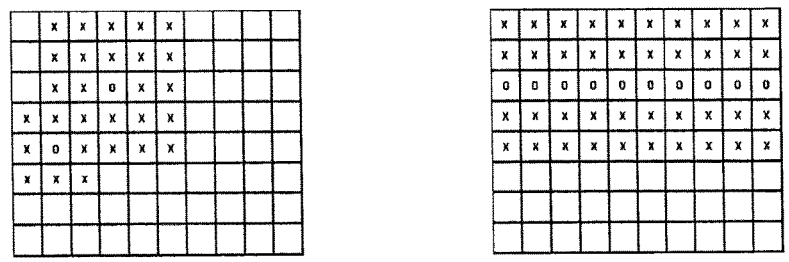

FIG. 9 illustrates (indexes of) the influence area of a selected Gréville point inside the grid (left grid) and (indexes of) the influence area of a selected Gréville point on the boundary of the grid (middle and right grids). Selected Gréville points are marked "o", influence area includes "x" and "o" points. FIG. 10 illustrates (indexes of) the influence area of two selected Gréville points (left grid) and (indexes of) the influence area of a line of selected Gréville points (right grid). Finally, given indexes V of the user selected Gréville points $(G_{kl})_{(k,l) \in V}$, indexes of grid T are arranged into three categories. The outside of the influence area $T-Z(V)$, the user-selected indexes V and the influence indexes that are not user selected $Z(V)-V$.

Influence Ratio

The influence ratio is a user-defined number $\alpha \in [\epsilon, 1]$. It defines uniquely the first predetermined number, which is thereby parameterizable via user settings. It may also be used to define indirectly the influence area. The smallest deformation ratio is obtained with $\alpha = \epsilon$. The widest deformation ratio is obtained with $\alpha = 1$. From the user interface point of view, zero value is displayed instead of $\epsilon$. This way, the user manipulates a parameter in the [0,1] interval, which is simpler.

Regulation Parameter

The multi-dimensional regulation parameter $\mu$ is introduced. It is an internal modeling parameter that is hidden to the user in an example.

$$\mu = (\mu_{ij})_{(i,j) \in \{0, \ldots, n\} \times \{0, \ldots, m\}} \in \mathbb{R}^{(n+1)(m+1)}$$

The role of the regulation parameter is to adjust how unknown control points $P_{ij}$ are kept close to initial control points $Q_{ij}$. The minimization program defined earlier is adapted as follows:

$$\sum_{i=0}^{n} \sum_{j=0}^{m} \mu_{ij} \|P_{ij} - Q_{ij}\|^2$$

Numerical values of the regulating parameter $\mu$ are defined by using the predetermined influence area $Z(V)$ and the user defined influence ratio $\alpha$.

If $(i, j)$ is out of the influence area, that is $(i, j) \in T-Z(V)$, then $\mu_{ij} = N_\infty$.

If $(i, j)$ is the index of a user selected Gréville point, that is $(i, j) \in V$, then $\mu_{ij} = 1$.

If $(i, j)$ is inside the influence area, but not the index of a user selected Gréville point, that is $(i, j) \in Z(V)-V$, then $$\mu_{ij} = \frac{1}{\alpha}.$$

Consequently, the minimized criteria can be written:

$$N_\infty \sum_{(i,j)\in T-Z(V)} \|P_{ij}-Q_{ij}\|^2 + \sum_{(i,j)\in V} \|P_{ij}-Q_{ij}\|^2 + \frac{1}{\alpha}\sum_{(i,j)\in Z(V)-V} \|P_{ij}-Q_{ij}\|^2 \quad 5$$

Clearly, if the user sets $\alpha=\varepsilon$, then $\mu_{ij}=N_\infty$ for all $(i,j)\in T-V$ and the minimized criteria is equivalent to:

$$\sum_{(i,j)\in T-V} \|P_{ij}-Q_{ij}\|^2 + \varepsilon \sum_{(i,j)\in V} \|P_{ij}-Q_{ij}\|^2$$

Thus, all initial control points $Q_{ij}$ associated with the Gréville points outside the influence area have a very strong effect. So, the surface deformation is narrowed to the neighborhood of the user selected Gréville points.

On the other hand, if the user sets $\alpha=1$, then $\mu_{ij}=1$ for all $(i,j)\in Z(V)$ and $\mu_{ij}=N_\infty$, for all $(i,j)\in T-Z(V)$ and the minimized criteria is equivalent to:

$$\sum_{(i,j)\in T-Z(V)} \|P_{ij}-Q_{ij}\|^2 + \varepsilon \sum_{(i,j)\in Z(V)} \|P_{ij}-Q_{ij}\|^2 \quad 25$$

Figure 11:
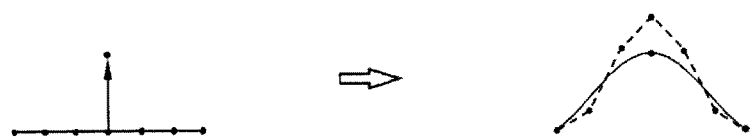
Figure 12:
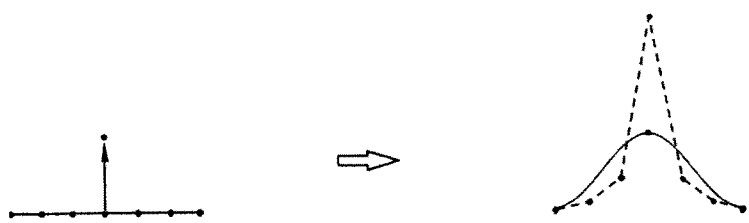
Figure 13:
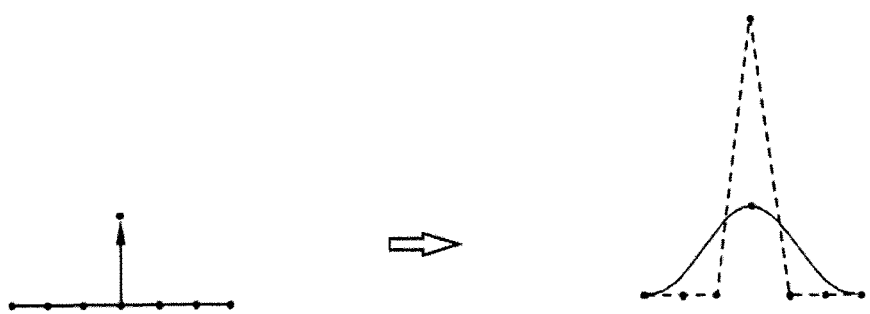

FIGS. 11-13 illustrate the shaping role of the influence ratio on an example NURBS curve. The initial NURBS curve is a horizontal curve and the user's action is to move the middle Gréville point vertically as illustrated in left drawings. The right drawing is the resulting NURBS curve together with its control polygon (dashed lines). In FIG. 11, the influence ratio is $\alpha=1$. In FIG. 12, the influence ratio is $\alpha=0.5$. In FIG. 13, the influence ratio is $\alpha=\varepsilon$. Notice that only the control point associated with the selected Gréville point is displaced. Other control points are those of the initial horizontal NURBS curve.

Figure 14:
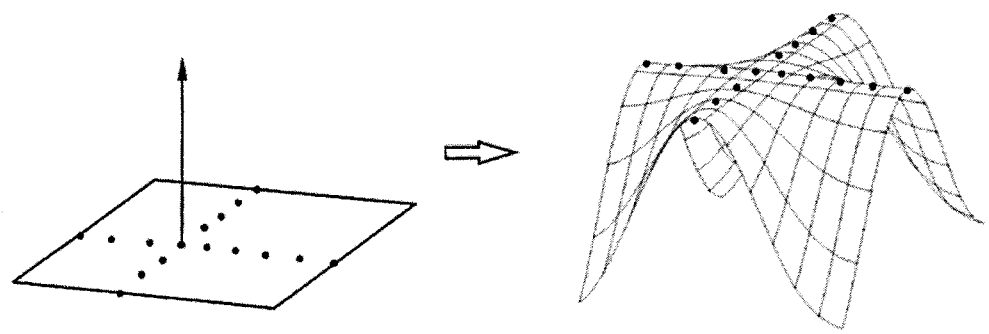
Figure 15:
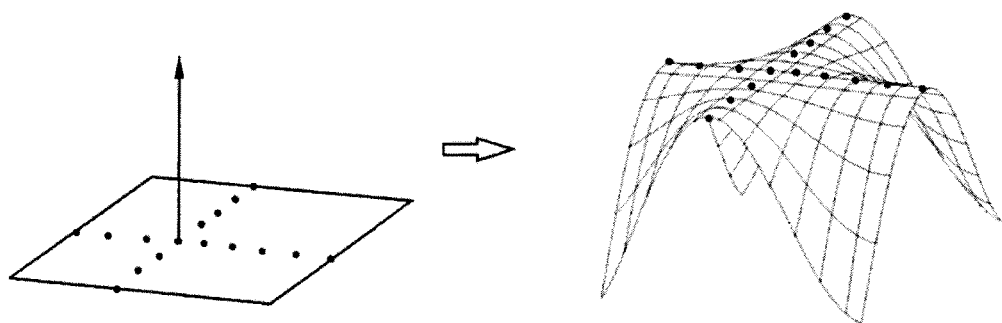
Figure 16:
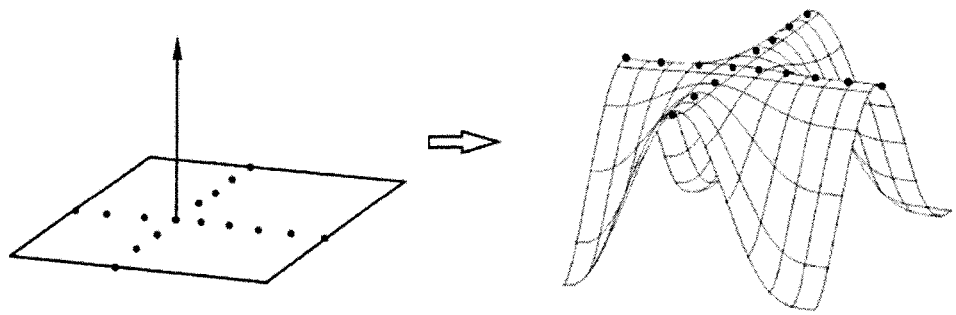

FIGS. 14-16 illustrate the influence ratio effect on an example NURBS surface deformation. The initial NURBS surface is flat patch and the user's action is to move upward the selected Gréville points (bold dots). For clarity, control points are not illustrated. In FIG. 14, the influence ratio is $\alpha=1$. In FIG. 15, the influence ratio is $\alpha=0.5$. In FIG. 16, the influence ratio is $\alpha=\varepsilon$. The shaping effect is more visible on the flatten corners of the resulting NURBS surface.

As detailed above, the program of the example is of the type:

$$\sum_{i=0}^{n}\sum_{j=0}^{m} \mu_{ij}\|P_{ij}-Q_{ij}\|^2$$

where $P_{ij}$ and $Q_{ij}$ are the control points respectively after the update and before the update. Such a quadratic objective function is simple to solve, as it can be solved in linear time and thus provide high responsiveness.

This quadratic formulation is now discussed.

A more suitable formulation of the minimized criteria involves matrix $W\in \mathcal{L}(\mathbb{R}^{3(n+1)(m+1)})$ the coefficients of which are the regulation parameters $\mu_{ij}$. It must be noticed that matrix $W$ depends on the influence ratio $\alpha$ through regulation parameters $\mu_{ij}$ as explained previously. This way, formula $$\sum_{i=0}^{n}\sum_{j=0}^{m} \mu_{i,j}\|P_{i,j}-Q_{i,j}\|^2$$

is equivalent to $$(P-Q)^T W (P-Q)$$

From the previous definition, it is clear that $W$ is diagonal. For example, noting $$P_{ij}-Q_{ij}=X_{ij}=\begin{pmatrix}x_{ij}\\y_{ij}\\z_{ij}\end{pmatrix}\in\mathbb{R}^3$$

and choosing $n=m=1$, the original formula is:

$$\sum_{i=0}^{1}\sum_{j=0}^{1} \mu_{ij}\|P_{ij}-Q_{ij}\|^2 = \mu_{00}(x_{00}^2+y_{00}^2+z_{00}^2) +$$

$$\mu_{01}(x_{01}^2+y_{01}^2+z_{01}^2) + \mu_{10}(x_{10}^2+y_{10}^2+z_{10}^2) + \mu_{11}(x_{11}^2+y_{11}^2+z_{01}^2)$$

And the equivalent simple formula featuring matrix $W\in \mathcal{L}(\mathbb{R}^{12})$ is:

$$\begin{pmatrix}x_{00}\\y_{00}\\z_{00}\\x_{01}\\y_{01}\\z_{01}\\x_{10}\\y_{10}\\z_{10}\\x_{11}\\y_{11}\\z_{11}\end{pmatrix}^T \begin{pmatrix}\mu_{00}&0&0&0&0&0&0&0&0&0&0&0\\0&\mu_{00}&0&0&0&0&0&0&0&0&0&0\\0&0&\mu_{00}&0&0&0&0&0&0&0&0&0\\0&0&0&\mu_{01}&0&0&0&0&0&0&0&0\\0&0&0&0&\mu_{01}&0&0&0&0&0&0&0\\0&0&0&0&0&\mu_{01}&0&0&0&0&0&0\\0&0&0&0&0&0&\mu_{01}&0&0&0&0&0\\0&0&0&0&0&0&0&\mu_{10}&0&0&0&0\\0&0&0&0&0&0&0&0&\mu_{10}&0&0&0\\0&0&0&0&0&0&0&0&0&\mu_{10}&0&0\\0&0&0&0&0&0&0&0&0&0&\mu_{11}&0\\0&0&0&0&0&0&0&0&0&0&0&\mu_{11}\\0&0&0&0&0&0&0&0&0&0&0&\mu_{11}\end{pmatrix}\begin{pmatrix}x_{00}\\y_{00}\\z_{00}\\x_{01}\\y_{01}\\z_{01}\\x_{10}\\y_{10}\\z_{10}\\x_{11}\\y_{11}\\z_{11}\end{pmatrix}$$

As matrix W is a diagonal matrix, $W=W^T$. Furthermore, matrix W is invertible because regulation parameters do not vanish.

The Lagrange solving of this example is now discussed, as the Lagrange solving was explained for the non-weighted example earlier (i.e. weights $\mu_{ij}$ all equal to 1).

Here again, the symbolic resolution is a classical application of Lagrange multipliers. Computations are reproduced for consistency. For solving purpose only, the unknown Lagrange multiplier vector $\lambda \in \mathbb{R}^{3|V|}$ is introduced so that the Lagrange function of the problem is:

$$L(P,\lambda) = \frac{1}{2}(P-Q)^T W(P-Q) + \langle \lambda, \tilde{A}P - \tilde{G} \rangle$$

The equation of the problem is:

$$\frac{\partial L}{\partial P}(P,\lambda) = 0$$

$$\frac{\partial L}{\partial \lambda}(P,\lambda) = 0$$

The partial derivatives of L are:

$$\frac{\partial L}{\partial P}(P,\lambda) = W(P-Q) + \tilde{A}^T \lambda$$

$$\frac{\partial L}{\partial \lambda}(P,\lambda) = \tilde{A}P - \tilde{G}$$

The first line can be written $W(P-Q+W^{-1}\tilde{A}^T\lambda)$ so that $W(P-Q)+\tilde{A}^T\lambda=0$ is equivalent to $P-Q+W^{-1}\tilde{A}^T\lambda=0$. Consequently, the linear system featuring unknowns P and $\lambda$ is:

$$P+W^{-1}\tilde{A}^T\lambda=Q$$

$$\tilde{A}P=\tilde{G}$$

The equivalent matrix-vector formulation:

$$\begin{pmatrix} I & W^{-1}\tilde{A}^T \\ \tilde{A} & 0 \end{pmatrix} \begin{pmatrix} P \\ \lambda \end{pmatrix} = \begin{pmatrix} Q \\ \tilde{G} \end{pmatrix}$$

This system is solved as follows. Multiplying the first equation by $\tilde{A}$ yields:

$$\tilde{A}P+\tilde{A}W^{-1}\tilde{A}^T\lambda=\tilde{A}Q$$

$$\tilde{A}P=\tilde{G}$$

Then, by using the second equation:

$$\tilde{G}+\tilde{A}W^{-1}\tilde{A}^T\lambda=\tilde{A}Q$$

Matrix $\tilde{A}W^{-1}\tilde{A}^T$ is invertible because matrix $\tilde{A}\tilde{A}^T$ is invertible, so $\lambda$ is computed:

$$\lambda=(\tilde{A}W^{-1}\tilde{A}^T)^{-1}(\tilde{A}Q-\tilde{G})$$

Finally, since $P=Q-W^{-1}\tilde{A}^T\lambda$, $$P=Q-W^{-1}\tilde{A}^T(\tilde{A}W^{-1}\tilde{A}^T)^{-1}(\tilde{A}Q-\tilde{G})$$

This can be arranged by separating the role of input data Q and $\tilde{G}$:

$$P=(I-W^{-1}\tilde{A}^T(\tilde{A}W^{-1}\tilde{A}^T)^{-1}\tilde{A})Q+W^{-1}\tilde{A}^T(\tilde{A}W^{-1}\tilde{A}^T)^{-1}\tilde{G}$$

This way, when displaying a real time feedback, the first term remains constant when the Gréville points are moved. Conversely, when the influence ratio $\alpha$ is changed, both terms are updated because regulation parameters $\mu_{ij}$, and thus matrix W, depend on $\alpha$.

Figure 17:
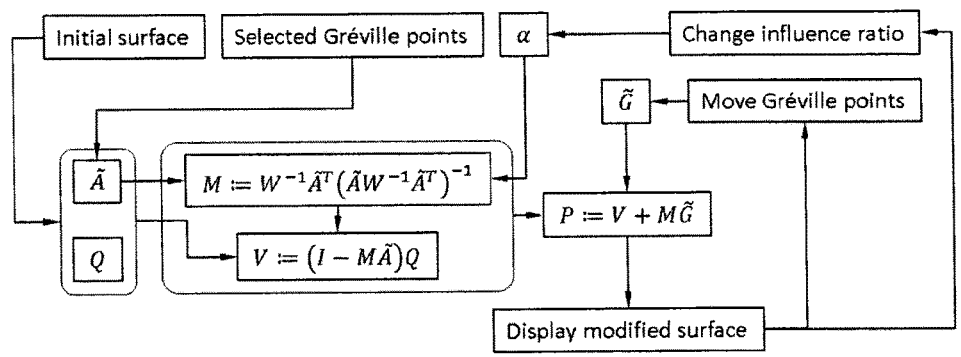

Once the NURBS surface and some Gréville points are selected, and a default value for influence ratio $\alpha$ is set, a first step computes matrix $M:=W^{-1}\tilde{A}^T(\tilde{A}W^{-1}\tilde{A}^T)^{-1}$ and vector $V:=(I-M\tilde{A})Q$. Matrix M and vector V remain unchanged during the Gréville points manipulation. Then, when the user moves selected Gréville points $\tilde{G}$, the algorithm updates the control points P by computing $P:=V+M\tilde{G}$. When the user changes the influence ratio $\alpha$ all terms need an update because matrix M depends on $\alpha$. FIG. 17 illustrates the data flow.

The invention claimed is:

1. A computer-implemented method for designing a 3D modeled object, the method comprising:
providing, to a computer system, a non-uniform rational B-spline (NURBS) surface that represents the 3D modeled object and that is defined by a grid of control points;
determining, by the computer system, a grid of surface points that belong to the NURBS surface, the grid of surface points corresponding to the grid of control points according to a predetermined invertible function;
displaying, by the computer system, the NURBS surface and, on the NURBS surface, the grid of surface points;
selecting, by graphical user-interaction, a subset of the surface points;
modifying, by graphical user-interaction, position of the selected subset of surface points, and accordingly, updating real-time, by the computer system, the surface, the update being performed according to the predetermined invertible function,
the updating of the surface including updating the grid of control points by optimizing a program that penalizes geometrical deformation of the NURBS surface, under the constraint that the position of the selected subset of surface points be as modified, the program penalizing geometrical deformation of the NURBS surface by penalizing, for each respective control point, a distance between the respective control point before the update and the respective control point after the update.

2. The method of claim 1, wherein the grid of surface points is the grid of Gréville points.

3. The method of claim 1, wherein the program penalizes, for each respective control point, the distance between the respective control point before the update and the respective control point after the update with a weight that is an increasing function of the distance between the surface point that corresponds to the respective control point and the selected subset of surface points.

4. The method of claim 3, wherein the method further comprises parameterizing, by graphical user-interaction, the increasing function.

5. The method of claim 3, wherein the increasing function is an indicator function equal to 1 for each respective control point that corresponds to a surface point in the selected subset of surface points, to a first predetermined number strictly higher than 1 for each other respective control point that corresponds to a surface point that belongs to a largest square in the grid of surface points centered on a selected non-corner surface point, or to a surface point that belongs to the quarter of the grid of surface points containing a selected corner surface point, and to a second predetermined number higher than ten times the first predetermined number for each other respective control point.

6. The method of claim 5, wherein the method comprises setting, by graphical user-interaction, the first predetermined number.

7. The method claim 1, wherein the program is a convex energy depending on the control points respectively after the update and before the update.

8. The method of claim 7, wherein the program is of the type:

$$\sum_{i=0}^{n}\sum_{j=0}^{m}\mu_{ij}\|P_{ij}-Q_{ij}\|^2$$

where $P_{ij}$ and $Q_{ij}$ are the control points respectively after the update and before the update.

9. The method of claim 7, wherein the program is solved with a Lagrange solving.

10. The method of claim 9, wherein the Lagrange solving comprises determining the parameters of an affix function that takes the position of the selected subset of surface points as input and that outputs the updated control points, and then applying the affix function to the position of the selected subset of surface points as modified.

11. The method of claim 10, wherein modifying position of the selected subset of surface points and updating the grid of control points is iterated, with the same selected subset of surface point, the parameters of the affix function being computed and stored at the initial iteration and then retrieved throughout subsequent iterations.

12. A non-transitory data storage medium having recorded thereon a computer program comprising instructions for performing a computer-implemented method for designing a 3D modeled object, the method comprising:
providing, to a computer system, a non-uniform rational B-spline (NURBS) surface that represents the 3D modeled object and that is defined by a grid of control points;
determining, by the computer system, a grid of surface points that belong to the NURBS surface, the grid of surface points corresponding to the grid of control points according to a predetermined invertible function;
displaying, by the computer system, the NURBS surface and, on the NURBS surface, the grid of surface points;
selecting, by graphical user-interaction, a subset of the surface points;
modifying, by graphical user-interaction, position of the selected subset of surface points, and accordingly, updating real-time, by the computer system, the surface, the update being performed according to the predetermined invertible function,
the updating of the surface including updating the grid of control points by optimizing a program that penalizes geometrical deformation of the NURBS surface, under the constraint that the position of the selected subset of surface points be as modified, the program penalizing geometrical deformation of the NURBS surface by penalizing, for each respective control point, a distance between the respective control point before the update and the respective control point after the update.

13. A CAD system comprising a processor coupled to a memory and a graphical user interface, the memory having recorded thereon a computer program comprising instructions for performing a computer-implemented method for designing a 3D modeled object, the method comprising:
providing, to a CAD system, a non-uniform rational B-spline (NURBS) surface that represents the 3D modeled object and that is defined by a grid of control points;
determining, by the CAD system, a grid of surface points that belong to the NURBS surface, the grid of surface points corresponding to the grid of control points according to a predetermined invertible function;
displaying, by the CAD system, the NURBS surface and, on the NURBS surface, the grid of surface points;
selecting, by graphical user-interaction, a subset of the surface points;
modifying, by graphical user-interaction, position of the selected subset of surface points, and accordingly, updating real-time, by the computer system, the surface, the update being performed according to the predetermined invertible function,
the updating of the surface including updating the grid of control points by optimizing a program that penalizes geometrical deformation of the NURBS surface, under the constraint that the position of the selected subset of surface points be as modified, the program penalizing geometrical deformation of the NURBS surface by penalizing, for each respective control point, a distance between the respective control point before the update and the respective control point after the update.

* * * * *